(12) United States Patent
Liao

(10) Patent No.: US 9,374,699 B2
(45) Date of Patent: Jun. 21, 2016

(54) PROXIMITY-BASED SERVICE REGISTRATION METHOD AND RELATED APPARATUS

(71) Applicant: HTC Corporation, Taoyuan (TW)

(72) Inventor: Ching-Yu Liao, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 1 day.

(21) Appl. No.: 14/120,268

(22) Filed: May 14, 2014

(65) Prior Publication Data

US 2014/0342735 A1 Nov. 20, 2014

Related U.S. Application Data

(60) Provisional application No. 61/822,929, filed on May 14, 2013.

(51) Int. Cl.
| | |
|---|---|
| *H04W 4/00* | (2009.01) |
| *H04W 8/04* | (2009.01) |
| *H04W 60/00* | (2009.01) |
| *H04W 8/10* | (2009.01) |
| *H04W 92/18* | (2009.01) |

(52) U.S. Cl.
CPC .............. *H04W 8/04* (2013.01); *H04W 60/00* (2013.01); *H04W 8/10* (2013.01); *H04W 92/18* (2013.01)

(58) Field of Classification Search
CPC ........... H04W 8/04; H04W 8/10; H04W 8/12; H04W 60/00; H04W 92/18
USPC ............................ 455/435.1–435.3, 410–411
See application file for complete search history.

(56) References Cited

U.S. PATENT DOCUMENTS

2014/0206314 A1* 7/2014 Abdallas ...................... 455/411

FOREIGN PATENT DOCUMENTS

WO WO2014166294 * 10/2014

OTHER PUBLICATIONS

3GPP TR 22.803 V12.1.0 (Mar. 2013), "3rd Generation Partnership Project; Technical Specification Group Services and System Aspects; Feasibility study for Proximity Services (ProSe) (Release 12)," Technical Report.
3GPP TR 23.703 V0.3.0 (Apr. 2013), "3rd Generation Partnership Project; Technical Specification Group Services and System Aspects; Study on architecture enhancements to support Proximity Services (ProSe) (Release 12)," Technical Report.

(Continued)

*Primary Examiner* — Wayne Cai
(74) *Attorney, Agent, or Firm* — Birch, Stewart, Kolasch & Birch, LLP

(57) ABSTRACT

A Proximity-based Service (ProSe) registration method for a user equipment (UE) of a wireless communication system, used in a Mobility Management Entity (MME) of the wireless communication system is disclosed. The method includes: receiving an attach request or a tracking area update request for requesting ProSe UE registration from the UE; retrieving ProSe subscription information and ProSe preference settings related to the UE from a home subscriber server (HSS) of the wireless communication system and storing the ProSe subscription information and the ProSe preference settings related to the UE as a ProSe context of the UE; and transmitting a ProSe registration request including a ProSe identifier of the UE and the ProSe preference settings related to the UE to a ProSe server of the wireless communication system.

14 Claims, 10 Drawing Sheets

(56) References Cited

OTHER PUBLICATIONS

3GPP TS 23.401 V12.0.0 (Mar. 2013), "3rd Generation Partnership Project; Technical Specification Group Services and System Aspects; General Packet Radio Service (GPRS) enhancements for Evolved Universal Terrestrial Radio Access Network (E-UTRAN) access (Release 12)," Technical Specification.

Renesas Mobile Europe Ltd. "Reference Architecture Model for ProSe," SA WG2 Meeting #96 S2-131231, San Diego, US, Apr. 8-12, 2013.

* cited by examiner

PROXIMITY-BASED SERVICE REGISTRATION METHOD AND RELATED APPARATUS

CROSS REFERENCE TO RELATED APPLICATIONS

The present application is based on, claims the benefit of U.S. Provisional Application No. 61/822,929, filed on May 14, 2013, the entirety of which is incorporated by reference herein.

TECHNICAL FIELD

Aspects of the present invention relate generally to a method for wireless communications systems and, more particularly, to a Proximity-based Service (ProSe) registration method for ProSe device registration and ProSe application user registration in wireless communications systems.

BACKGROUND

In a typical mobile communications environment, a user equipment (UE) device such as a mobile phone (also known as a cellular or cell phone), a laptop computer with wireless communications capability, or a personal digital assistant (PDA), etc., may communicate voice and/or data signals with one or more service networks. The wireless communications between the UE and the service networks may be in compliance with various wireless technologies. Long-term evolution (LTE), initiated by the third generation partnership project (3GPP), is now being regarded as a new radio interface and radio network architecture that provides a high data rate, low latency, packet optimization, and improved system capacity and coverage. An evolution of core network with non-radio access aspects, known as System Architecture Evolution (SAE), is also initiated by 3GPP in accompanying with LTE.

Evolved Packet System (EPS) is a purely IP based network, consisting of UEs, a LTE radio access network known as Evolved Universal Terrestrial Radio Access Network (E-UTRAN), and a SAE core network known as Evolved Packet Core (EPC). The EPS uses the concept of "EPS bearers" to route IP traffic from a gateway in external packet data networks to the UE. A bearer is an IP packet flow with a specific Quality of Service (QoS) between the gateway and the UE. The E-UTRAN is simply a network of plurality of evolved Node-Bs (eNBs), generating a flat architecture and there is no centralized intelligent controller. The eNBs are normally inter-connected via the X2-interface and towards the EPC by the S1-interface. The EPC includes a Mobility Management Entity (MME), a Home Subscriber Server (HSS), a serving gateway (SGW), and a packet data network gateway (PDN GW or PGW). The MME deals with the control plane. It handles the signalling related to mobility and security for E-UTRAN access. The MME is responsible for the tracking and the paging of UE in idle-mode. It is the termination point of the Non-Access Stratum (NAS). The MME handles bearer management and connection management. The HSS is a database that contains user-related and subscriber-related information. The HSS also provides support functions in mobility management, call and session setup, user authentication and access authorization. The Serving GW is the point of interconnect between the radio-side and the EPC, and it serves the UE by routing the incoming and outgoing IP packets. The PDN GW is the point of interconnect between the EPC and external IP networks called PDN (Packet Data Network), and it routes packets to and from the PDNs.

A long term evolution-advanced (LTE-A) system, as its name implies, is an evolution of the LTE system and has a similar network structure to the LTE system. In LTE-related systems, Proximity-based Service (ProSe) communication has been developed as a technology which allows UEs to communicate directly with each other in close proximity without transmitting/receiving data and/or control signals to the other via an eNB, which means a local or direct path can be used between the UEs. Therefore, in the 3GPP LTE spectrum, the operator can move the data path (i.e., user plane) off the access to core networks to direct links between the UEs. Please note that, the procedure for a UE registers for ProSe to the EPC is called ProSe UE registration or ProSe device registration, and the procedure for a ProSe application user registers to an application server is called ProSe application user registration, also called ProSe application registration or ProSe user registration in short.

When a user of the UE registers with an application server for a ProSe application, he/she is designated an application identifier (and one application is identified by an application identifier). Regarding ProSe user registration on the UEs, there are three cases to be considered, as shown in FIGS. 1A~1C. It should be noted that a user of the UE, e.g., the owner of a mobile phone or a laptop, may install multiple ProSe applications on his/her ProSe-enabled UE. The user may have one or more registered user accounts, i.e., user identifiers (user IDs) for each application.

In Case 1 of FIG. 1A, two applications are running on a user equipment, UE1, managed/provided by different application servers, AppServer 1 and AppServer 2, and the user of UE1 may have two user IDs, User-1A and User-2A for the two applications, respectively registered with AppServer 1 and AppServer 2.

In Case 2 of FIG. 1B, only one application is running on UE1 and managed/provided by an application server, AppServer 1, and the user of UE1 has two user IDs, User-1A and User-1B for the same application, both registered with AppServer 1.

In Case 3 of FIG. 1C, the user has two user equipments, UE1 and UE2 (e.g., a mobile phone and a laptop) running the same application managed by AppServer 1, and the user has one user ID, User-1A registered with AppServer 1, for the same application running on both UE1 and UE2.

However, some problems may be encountered while EPS deals with device (UE) registration and user registration when applying ProSe. For example, how EPS recognizes a ProSe-enabled UE with a device identifier and one or more application-level user identifiers (such as User-1A and User-1B in FIGS. 1A-1C), how EPS manages these identifiers, how EPS uses a temporary identifier for the ProSe service operated on a ProSe-enabled UE, and so on, are indefinite. Therefore, a registration method for ProSe UE registration and ProSe user registration to solve these problems is required.

SUMMARY

A detailed description is given in the following embodiments with reference to the accompanying drawings.

A Proximity-based Service (ProSe) registration method and a Proximity-based Service (ProSe) de-registration method for an application user of a user equipment (UE) or a user equipment (UE) of a wireless communication system are provided.

In one exemplary embodiment, the invention is directed to a Proximity-based Service (ProSe) registration method for a user equipment (UE) of a wireless communication system, used in a Mobility Management Entity (MME) of the wireless communication system, comprising: receiving an attach request or a tracking area update request for requesting ProSe UE registration from the UE; retrieving ProSe subscription information and ProSe preference settings related to the UE from a home subscriber server (HSS) of the wireless communication system and storing the ProSe subscription information and the ProSe preference settings related to the UE as a ProSe context of the UE; and transmitting a ProSe registration request including a ProSe identifier of the UE and the ProSe preference settings related to the UE to a ProSe server of the wireless communication system.

In one exemplary embodiment, the invention is directed to a Proximity-based Service (ProSe) registration method for an application user of a user equipment (UE), used in a ProSe server of a wireless communications system, comprising: receiving a ProSe service request including a ProSe identifier identifying the UE, an application server identifier uniquely identifying an application, and/or an application user identifier of the application user, from the application server, wherein the ProSe service request from the application server is sent in response to a user registration request including the ProSe identifier and the application user identifier from the UE; transmitting, an authorization request including the application server identifier to a home subscriber server (HSS) of the wireless communications system after the ProSe service request is received, for requesting the authorization to the application server; checking if the ProSe identifier is registered by an MME of the wireless communications system; and transmitting a ProSe service response message including an authorization result indicating the authorization is successful, to the application server, after the ProSe server determines that the authorization is successful.

In one exemplary embodiment, the invention is directed to a Proximity-based Service (ProSe) de-registration method for a user equipment (UE), used in a Mobility Management Entity (MME) of a wireless communication system, comprising: detecting that a user equipment (UE) registered to a ProSe server is detached for a ProSe service; and transmitting a first message including a ProSe identifier identifying the UE, to the ProSe server, for notifying the ProSe server to de-register the UE from the ProSe server.

A detailed description is given in the following embodiments with reference to the accompanying drawings.

DRAWINGS

The present invention can be more fully understood by reading the subsequent detailed description and examples with references made to the accompanying drawings, wherein:

FIGS. 1A~1C illustrate an exemplary block diagram of cases of user registration on the UEs.

DETAILED DESCRIPTION

Several exemplary embodiments of the application are described with reference to FIG. 1 to FIG. 9, which generally relate to a proximity-based service (ProSe) registration method for device registration and user registration and a wireless communications system.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3GPP specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station. The term "application" shown in the description means a ProSe application as the application which supports ProSe functionality.

DEFINITIONS

The following definitions are provided to promote understanding of the present invention.

ProSe identifier (ProSe ID)—an identifier of a device WE).

Application identifier (App ID)—an identifier of an application.

Application server identifier (APPServer ID)—an identifier of an application server; one application server identifier may associate with one or more App IDs. The following examples assume one-to-one mapping for an APPServer ID and an App ID.

ProSe server identifier (ProSe server ID)—an identifier of a ProSe server, which can also be the address of the ProSe server.

Figure 1A:
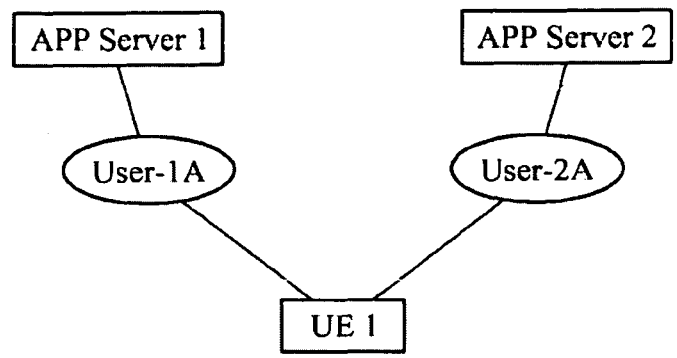
Figure 1B:
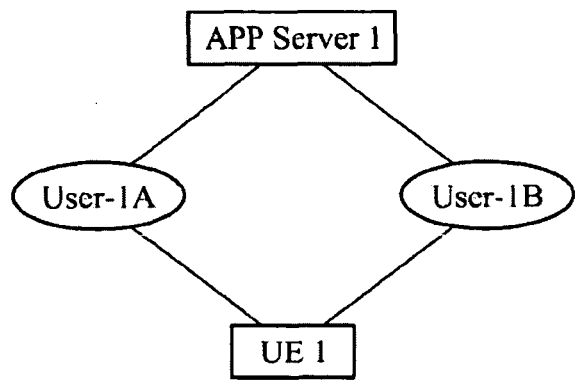
Figure 1C:
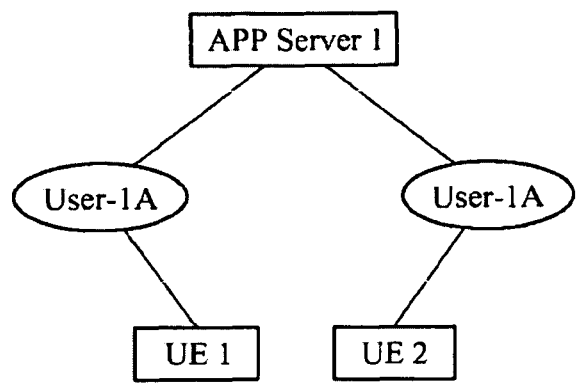

Application user identifier (User ID)—a user account belonging to a user, wherein the user may have one or more User IDs registered for an application; in other words, one or more User IDs are associated with one App ED as the example of FIG. 1B, in which User-1A and User-1B is registered for the same application provided by AppServer 1.

Figure 2:
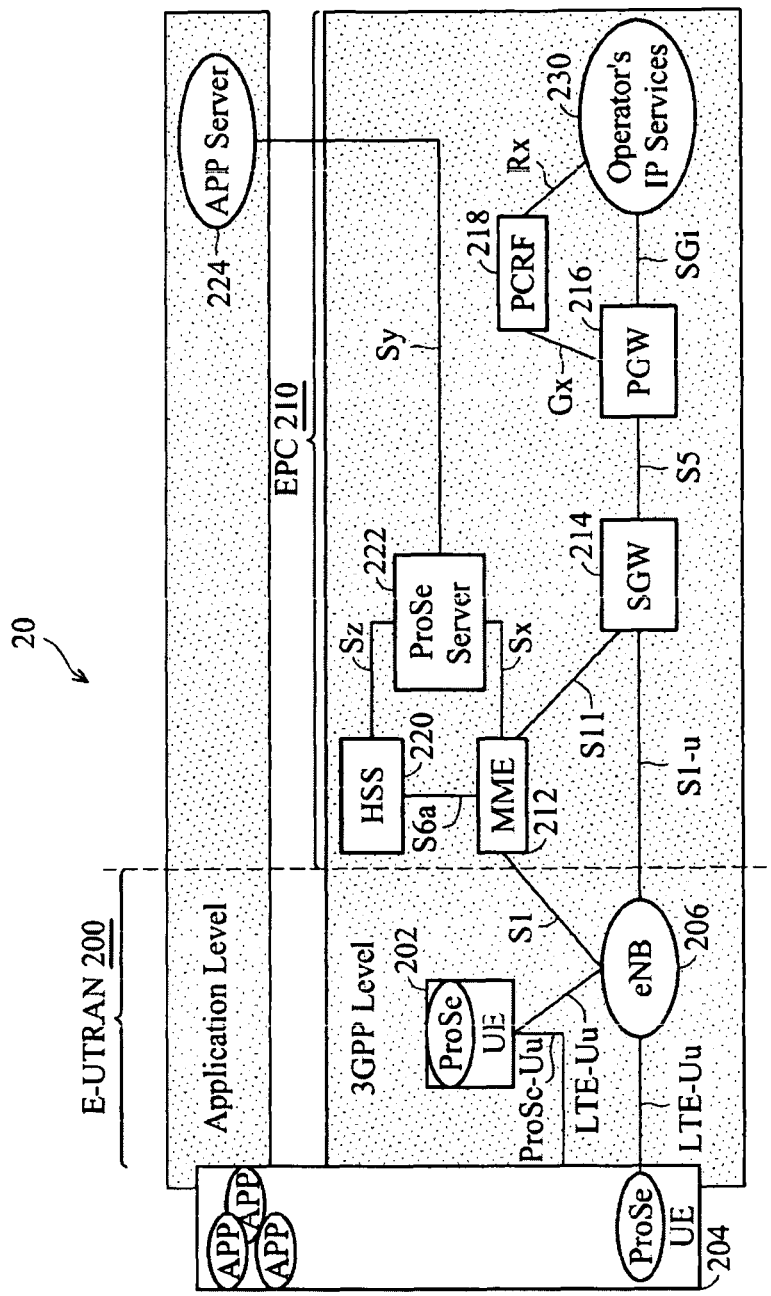
FIG. 2 illustrates an Evolved Packet System (EPS) which provides Proximity Services (ProSe) according to an embodiment of the present invention.

FIG. 2 illustrates an Evolved Packet System (EPS) 20 which provides Proximity Services (ProSe) according to an embodiment of the present invention. FIG. 2 further illustrates the relationship of the ProSe entities at the UE, the ProSe associated network entities in the Evolved Packet Core (EPC), and the application entities. The EPS 20 includes a UE 202, a UE 204, an Evolved Universal Terrestrial Radio Access Network (E-UTRAN) 200 and an EPC 210, wherein each UE (the UE 202 or 204) includes only one ProSe entity and one or more applications utilizing the ProSe functionality, each denoted as APP. The ProSe entity in each UE (e.g. UE 202 or 204) is utilized for the ProSe operations of discovery and communication. The ProSe entity communicates with the ProSe Server 222 on top of Non Access Stratum (NAS) signaling. APP(s) is an entity at the UE representing the third party applications or application instances in the UE designed for utilizing the proximity services. There may be more than one APP utilizing the ProSe functionality at the same time.

The E-UTRAN 200 includes one or more base stations, evolved Node-Bs (eNB) 206, which provides a user plane and a control plane and the eNB 206 communicates with each UE (e.g., UE 202 and the UE 204) via LTE-Uu interfaces. The UEs 202 and 204 communicate with each other via a ProSe-Uu interface. The core network, the EPC 210, controls the UEs and manages establishment of the bearers, and includes a Mobility Management Entity (MME) 212, a serving gateway (SGW) 214, a packet data network gateway (PGW) 216, a Policy and Charging Rules Function (PCRF) 218, a Home subscriber Server (HSS) 220, a ProSe server 222, and an application server 224, etc. The MME 212, the SGW 214, and the PGW 216 can be implemented in a gateway box. In some embodiments, the SGW 214 and PGW 216 can be implemented on separate network devices.

The MME 212 provides mobility management and session management on UEs by control plane signaling using Non-Access Stratum (NAS) protocols where the NAS packets is transported over S1-MME interfaces between the MME 212 and the eNB 206. The MME 212 and the SOW 214 communicate with each other via a S11 interface. The SOW 214 forwards and receives packets to and from the eNB 206 via an S1-u interface. The S1-u interface supports per-bearer user plane tunneling and inter-eNB path switching during handover.

The PGW 216 is connected to an external packet network (e.g., the Internet or operator's IP service center 230) via a SGi interface and is connected to the SOW 214 via an S5 interface. The PGW 216 serves IP address allocation for the UEs, as well as QoS enforcement and flow-based charging according to rules from the PCRF 218. The POW 216 also serves as the mobility anchor for inter-working with non-3GPP technologies such as CDMA2000 and WiMAX networks.

The PCRF 218 communicates with the POW 216 via a Gx interface and communicates with the operator's IP service center 230 via an Rx interface. The PCRF 218 serves to perform policy control decision-making, as well as for controlling the flow-based charging functionalities.

The HSS 220 is connected to the MME 212 via an s6a interface and stores subscriber data for each subscriber in the EPS 20. The subscriber data includes ProSe subscription information, related ProSe preference settings, a subscription profile, authentication vectors, and a list of allowed Access Point Names (APNs) for each subscriber. Each APN has a list of allowed PGWs for the subscriber. An APN may be considered as the network name (e.g., Internet, corporate intranet, etc.) associated with a particular packet data network (PDN).

The ProSe server 222 communicates with the MME 212 via an Sx interface which transfers ProSe related subscription information in the corresponding PLMN, communicates with the HSS 220 via an Sz interface which transfers ProSe related subscription and authentication data for authenticating/authorizing user access to the ProSe services, and communicates with the application server 224 via an Sy interface. The ProSe server 222 supports ProSe operations and is responsible for ProSe registration, control and authorization, charging and parameterization. For example, the ProSe server 222 authorizes the UE 202 and the UE 204 to use the ProSe service, such as to transmit/receive data or signaling directly with each other and to use any other features provided by the ProSe server 222. For example, a ProSe service can be a ProSe communication, or a ProSe direct discovery.

The application server 224 communicates with the ProSe server 222 for ProSe application user registration (a.k.a. user registration), authorization and control of the third-party application access to the ProSe services, via the Sy interface.

Figure 3:
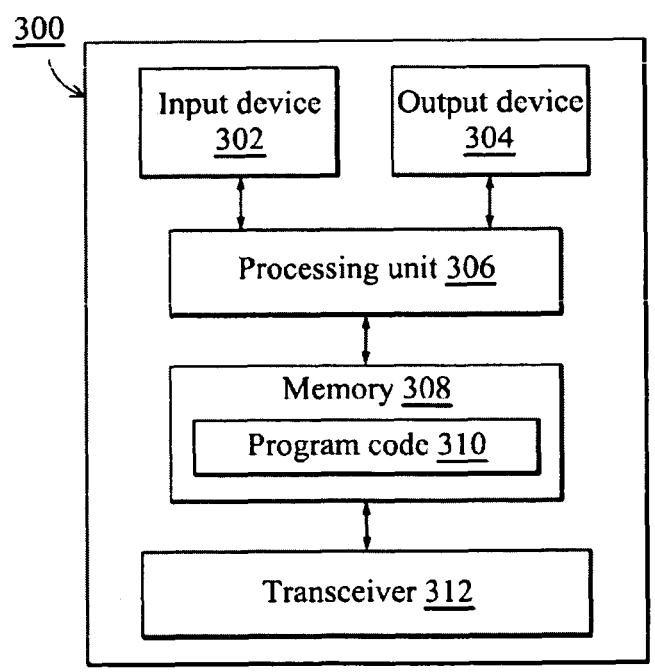
FIG. 3 is a functional block diagram of a communications device according to one embodiment of the present invention.

FIG. 3 is a functional block diagram of a communications device 300 according to one embodiment of the present invention. As shown in FIG. 3, the communication device 300 can be the UE 202 or 204, the eNB 206, the MME 212, the ProSe server 222 or the application server 224 in the EPS 20 of FIG. 2, and the communications device 300 is preferably used in the LTE system, the LTE-A system or any other similar wireless communications system. The communications device 300 may include an input device 302, an output device 304, a processing unit 306, a memory 308, a program code 310, and a transceiver 312. The processing unit 306 can be a Central Processing Unit (CPU), a microprocessor, or an Application Specific Integrated Circuit (ASIC) which is able to execute the program code 310 stored in the memory 308 and transmits the processing results of the program code 310 to the transceiver 312 to be transmitted on the air. The communications device 300 can receive signals input by a user through the input device 302, such as a keyboard keypad, touch screen, or microphone (for voice input), and can output images and sounds through the output device 304, such as a screen or speakers. The signal input/output from and to the input device 302 and output device 304 can also be processed by the processing unit 306. The transceiver 312 is used to receive and transmit radio signals under the control of the processing unit 306.

Figure 4:
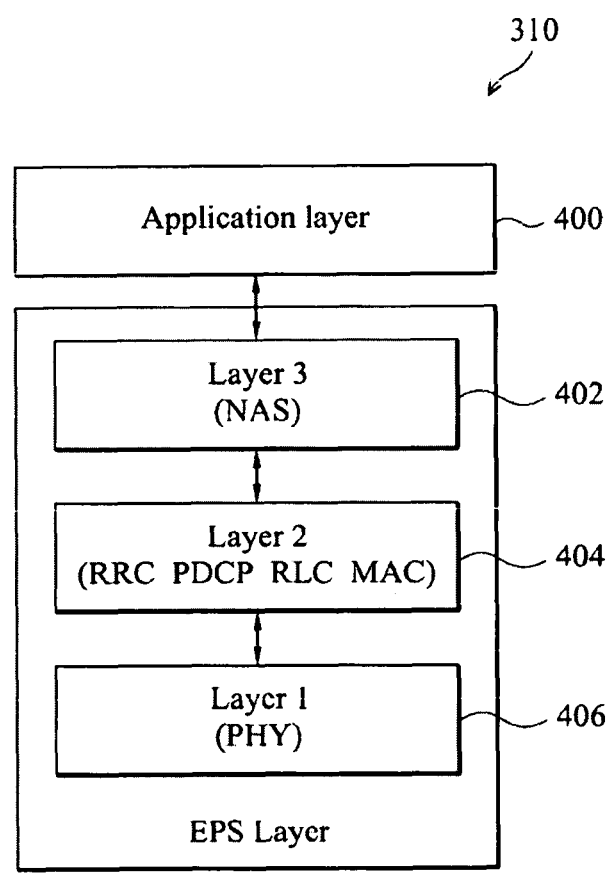
FIG. 4 is a block diagram of the program code shown in FIG. 3 in accordance with one embodiment of the invention.

FIG. 4 is a block diagram of the program code 310 shown in FIG. 3 in accordance with one embodiment of the invention. In this embodiment, the program code 310 is provided in many protocol layers and illustrated in a protocol stack structure, including an application layer 400 (in the user plane), a Layer 3 402 (as a Non Access Stratum (NAS) layer), a Layer 2 404 (including a Medium Access Control (MAC) layer, a Radio Link Control (RLC) layer, a Packet Data Convergence Protocol (PDCP) layer) and a Radio Resource Control (RRC) layer), and a Layer 1 406 (as a Physical (PHY) layer). The integration of Layers 1 to 3 can be regarded as a whole as an EPS layer. In other words, the program code 310 in the application layer (a.k.a upper layer) can transmitted/received signaling or data to the EPS layer by using LTE/LTE-A technologies; the application layer implements the operations of APP entities, and the EPS layer can implement the operations of the ProSe entity.

The application layer 400 performs signaling/data/media information exchange via user plane messages between the UE and the network. It is required that the UE has IP connectivity with the network. For example, if a user plane interface is applied between a UE and a ProSe server, the UE needs to obtain IP connectivity and then it can start to communicate with the ProSe server. The layer 3 (NAS) 402 handles the mobility management, e.g., to exchange location information and attachment status, and session management and communications between the MME 212 and the UEs by NAS messages.

Please note that, in the following embodiments, a ProSe service established between the UEs takes a ProSe communication (which means two UEs have ongoing data/signal transmission in between) as an example for simplicity. However, the ProSe communication is not the only ProSe service that UEs can use, other ProSe services such as ProSe discovery (in which the UE discovers the other UEs in proximity) can also be the service referenced in the following embodiment.

Figure 5:
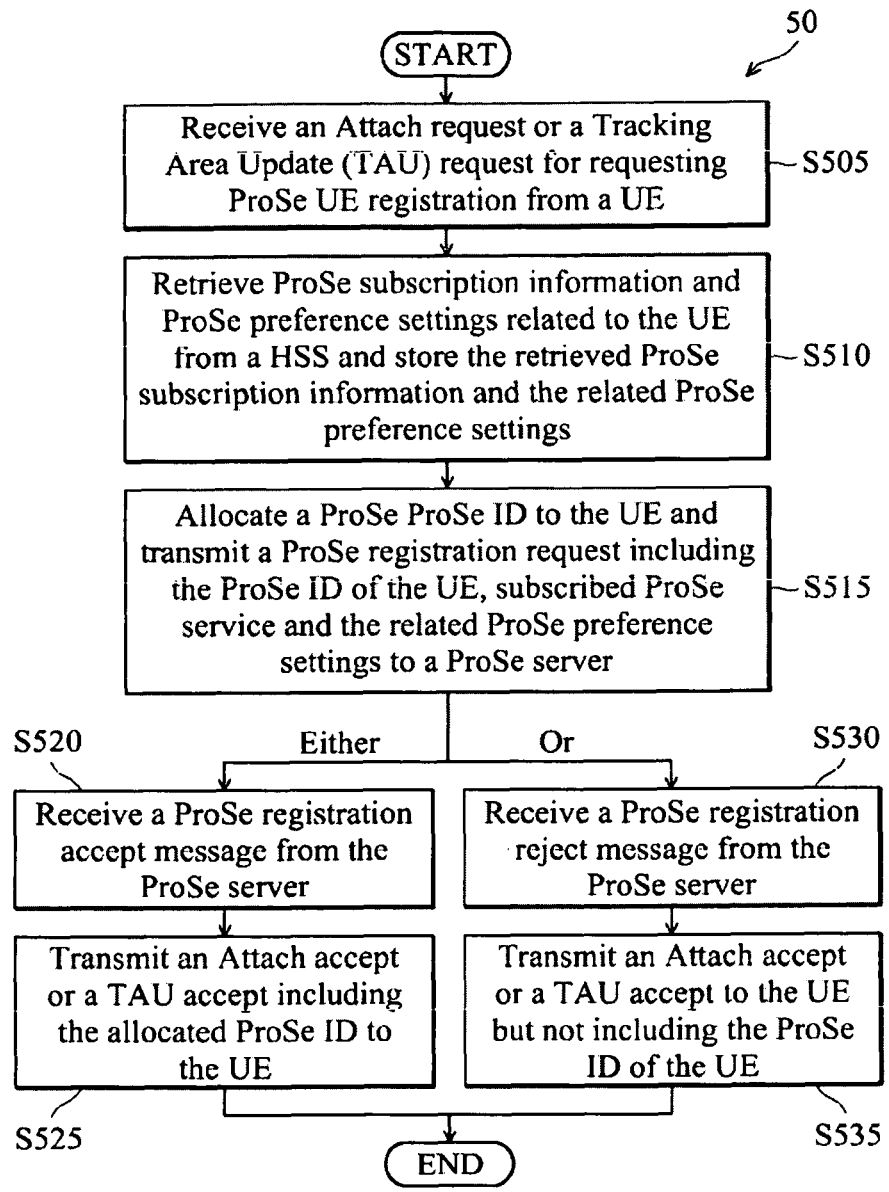
FIG. 5 is a flow chart of a process illustrating a ProSe registration method for a UE capable of ProSe to register with the EPC according to an embodiment of the invention with reference to the system in FIG. 2.

FIG. 5 is a flow chart of a process 50 illustrating a ProSe registration method for a UE capable of ProSe to register with the EPC, i.e., ProSe UE registration (or called ProSe device registration) according to an embodiment of the invention with reference to the system in FIG. 2. The process 50 is used in an MME such as the MME 212 in FIG. 2. In step S505, the MME receives an Attach request or a Tracking Area Update (TAU) request for requesting ProSe UE registration, from a UE, such as the UE 204 in FIG. 2. Next, in step S510, the MME retrieves ProSe subscription information and ProSe preference settings related to the UE from a HSS, such as the HSS 220, and stores (in the memory of the MME) the retrieved ProSe subscription information and the related ProSe preference settings. The retrieved ProSe subscription information indicates the subscribed ProSe services of the UE including ProSe discovery and/or ProSe communication. The related ProSe preference settings may be ProSe discovery preference (e.g., discoverable or not) or a level of discover range (e.g. small/medium/large or distance values). Next, in step S515, if the ProSe service is subscribed and authorized, the MME allocates a ProSe identifier (ProSe ID) to the UE and transmits a ProSe registration request including the ProSe ID of the UE, subscribed ProSe service and the related ProSe preference settings to a ProSe server, such as the ProSe server 222 in FIG. 2. It is notice that if the MME determines that the ProSe service is not authorized and subscribed, the MME does not transmits a ProSe registration request towards a ProSe server and the MME transmits an Attach accept or a TAU accept to the UE without including the ProSe ID of the UE, such that UE is informed that the ProSe UE registration is rejected. In this case, the corresponding update type indicated by the Attach accept or TAU accept may be "EPS only" since ProSe UE registration fails.

After the ProSe server has successfully received the ProSe registration request, the ProSe server then stores the received information, including the ProSe identifier and the related ProSe preference settings, and determines if the ProSe UE registration is successful. The ProSe server may transmit a response indicating that the ProSe UE registration is successful or unsuccessful, to the MME, in response to the ProSe registration request.

After the ProSe server determines that the ProSe UE registration is successful, in step S520, the MME receives a ProSe registration accept message from the ProSe server. Finally, in step S525, the MME transmits an Attach accept or a TAU accept including the allocated ProSe ID to the UE, so that the UE is able to store the ProSe ID of its own. The Attach accept or TAU accept may include information indicating an update type, and the corresponding update type is "EPS and ProSe registration" when the ProSe UE registration is regarded successful.

Otherwise, after receiving the ProSe registration request from the MME, the ProSe server may determine that the ProSe UE registration is unsuccessful and reject the ProSe UE registration by sending a response message with cause value indicating the rejection reason. In this situation, as in step S530, the MME receives a ProSe registration reject message from the ProSe server. The ProSe registration reject message may indicate the reason that results in the rejection, e.g., congestion is occurring in the system, the indicated ProSe service is not authorized, the PLMN is not allowed, or the ProSe server has run out of memory, etc. After, in step S535, the MME also transmits an Attach accept or a TAU accept to the UE but not including the ProSe ID of the UE, such that UE is informed that the ProSe UE registration is rejected. In this case, the corresponding update type indicated by the Attach accept or TAU accept may be "EPS only" since ProSe UE registration fails.

In the embodiment, the ProSe identifier is allocated by the MME. The ProSe identifier is a temporary UE identifier which identifies the UE enabling the ProSe feature, where the ProSe identifier can be a Globally Unique Temporary Identity (GUTI) or an International Mobile Subscriber Identity (IMSI), or a new ProSe identifier. The new ProSe identifier can be a newly generated temporary identifier which is globally unique and may further include a ProSe server identifier which identifies the ProSe server, e.g., the ProSe identifier can be a cascade of the GUTI or a newly generated temporary identifier and the ProSe server identifier. The ProSe server identifier is pre-configured in the MME or stored in the ProSe subscription information of the UE retrieved from the HSS during Attach or Tracking area update procedures.

In another embodiment, when the temporary UE identifier associated with the ProSe identifier of the UE is changed, the MME reallocates the ProSe identifier and updates the ProSe identifier to the UE and the ProSe server. For example, the MME sends a first update message including the reallocated ProSe identifier to the UE and sends a second update message including the reallocated ProSe identifier to the ProSe server, to update the ProSe identifier stored in the UE and in the ProSe server. Furthermore, when the ProSe server receives the reallocated ProSe identifier from the MME, the ProSe server replaces the old ProSe identifier (e.g., ProSe ID-X) with a new ProSe identifier (e.g., ProSe ID-Y), and informs the application servers which the old ProSe ID-X have registered with the ProSe server to update the ProSe identifier, by sending the new ProSe ID-Y to replace the old ProSe ID-X to the registered application servers based on stored information of the application identifier and/or application server identifier, which provides information of the application server address.

Figure 6:
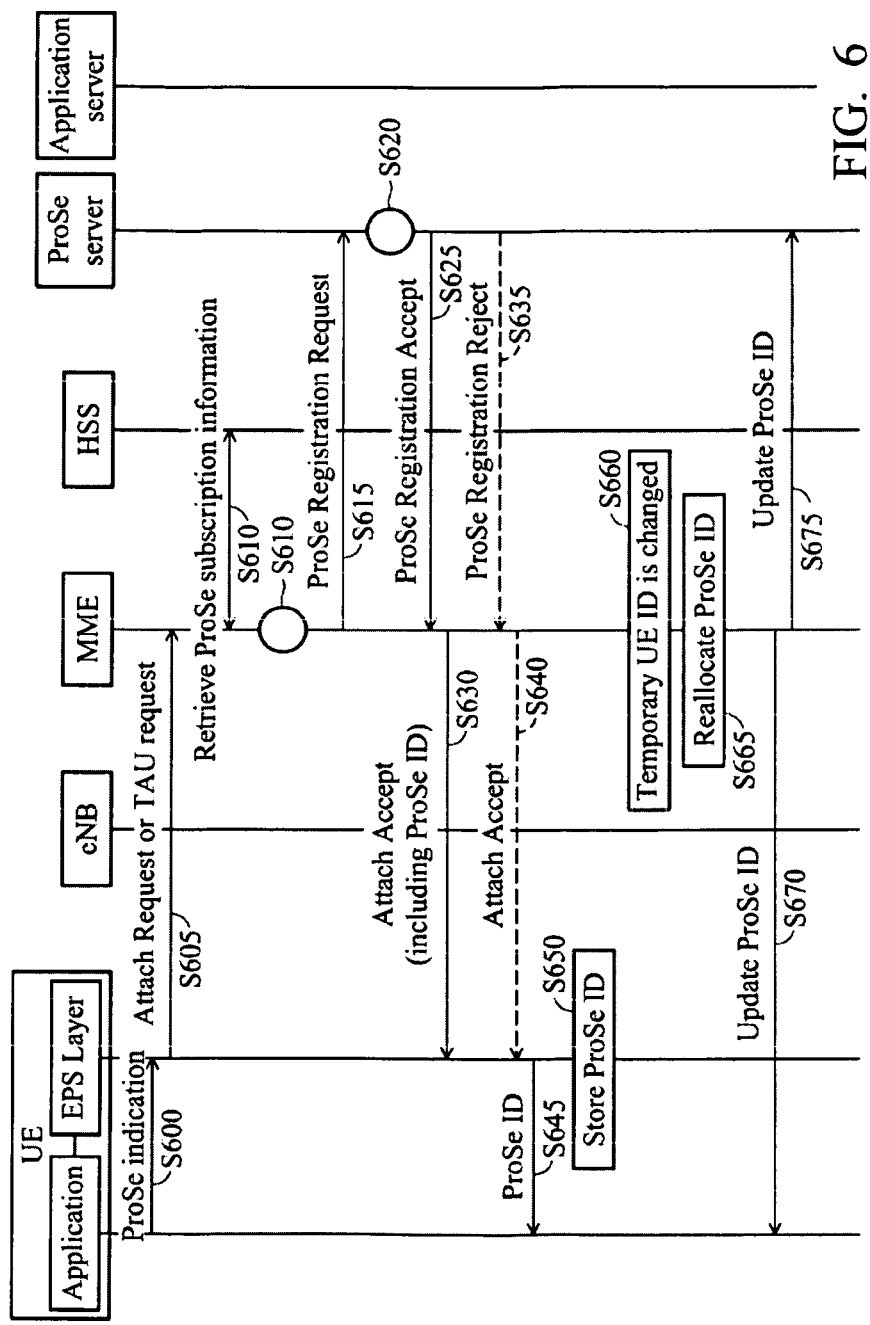
FIG. 6 is a diagram of a ProSe UE registration procedure in view of an Evovled Packet System according to an embodiment of the present invention.

FIG. 6 is a diagram of a ProSe UE registration procedure in view of an Evolved Packet System according to an embodiment of the present invention. The EPS using the ProSe UE registration procedure of FIG. 6 can be the EPS 20 in FIG. 2, where each entity can be referred to the EPS 20. The cooperating entities are UE, eNB, MME, HSS, and ProSe server. Note that, the UE shown in FIG. 6 includes an Application layer and an EPS layer which are given description in the above. Note that, the ProSe UE registration procedure in MME side is based on the ProSe registration method of FIG. 5 and some of steps in FIG. 6 can be referred to the descriptions related to FIG. 5.

When an application running in the UE wants to use Proximity service to communicate with another UE, the application layer of the UE transmits a ProSe indication message to the EPS layer of the UE, as in step S600, to ask the EPS layer of the UE to perform a ProSe UE registration procedure.

Next, in step S605, the EPS layer of the UE transmits an attach request or a Tracking Area Update (TAU) request for requesting ProSe UE registration to the MME. In step S610, the MME retrieves and stores ProSe subscription information and ProSe preference settings related to the UE from the HSS. In step S615, the MME allocates a ProSe identifier of the UE and transmits a ProSe registration request including the ProSe identifier of the UE and the related ProSe preference settings to the ProSe server after checking the ProSe subscription and determining that the authorization of the UE for ProSe service.

After the ProSe server has successfully received the ProSe registration request, in step S620, the ProSe server then stores the received the ProSe identifier and the related ProSe preference settings and determines if the ProSe UE registration is successful. When the ProSe server determines the ProSe UE registration is successful, the ProSe server transmits a ProSe registration accept message indicating that the ProSe UE registration is successful, to the MME, as in step S625; otherwise, when the ProSe server determines the ProSe UE registration is unsuccessful, the ProSe server transmits a ProSe registration reject message indicating that the ProSe UE registration is rejected (unsuccessful) with an appropriate cause value, to the MME, as in step S635.

In response to a received response which may be either the ProSe registration accept message or the ProSe registration reject message, the MME transmits either an attach accept (or TAU accept) including the ProSe identifier of the UE, as in step S630, or an attach accept not including the ProSe identifier as in step S640, to the EPS layer of the UE. After the EPS layer of the UE receives the attach/TAU accept including the ProSe identifier of the UE, the EPS layer of the UE then transmits the ProSe identifier to the application layer of the UE as in step S645, and stores the ProSe identifier (in the memory of the UE) as in step S650. Then, the ProSe UE registration is finished. Note that, steps S605 to S640 can be referred to the above description of FIG. 5 which has more detailed embodiments.

In FIG. 6, steps S660, S665, S670 and S675 illustrated another embodiment related to the update of the ProSe identifier by the MME, which happens when the temporary UE identifier associated with the ProSe identifier of the UE is changed. Related descriptions are given in the above and are omitted herein.

Please note that, the above mentioned ProSe UE registration (also called ProSe device registration) is for the UE registers for ProSe service to the EPC, and is a part of ProSe registration procedure. As to an application user, who is a user account of the application requiring ProSe service, registers to an application server is called ProSe application user registration, also called ProSe application registration or ProSe user registration in short, which is the second part of ProSe registration procedure. A UE may have multiple applications requiring ProSe service running on the application layer. There may have one or more application user identifiers set for an application. Each application user would like to use required ProSe service needs to perform application user registration with the Application service by its application user account. Therefore, after finishing ProSe UE registration and obtaining ProSe ID for the UE, there may perform one or multiple times of application user registration procedures, e.g. there are different application user identifiers of an application or multiple applications requiring ProSe service.

Figure 7:
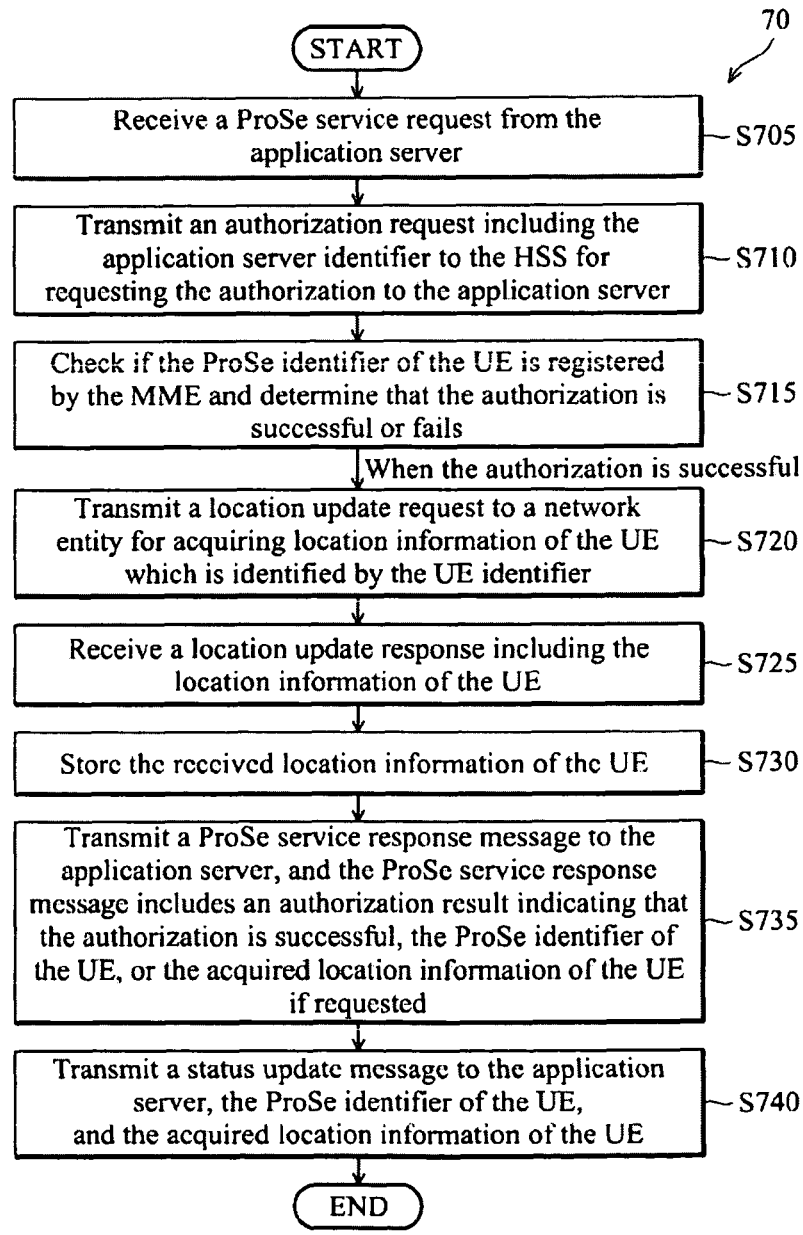
FIG. 7 is a flow chart of a process illustrating a ProSe registration method for an application user to register the application user with the ProSe server according to an embodiment of the invention with reference to the system in FIG. 2.

FIG. 7 is a flow chart of a process 70 illustrating a ProSe registration method for an application user to register the application user with the ProSe server, i.e., ProSe application user registration (or called ProSe user registration) according to an embodiment of the invention with reference to the system in FIG. 2. The process 70, including steps S705-S740, is used in a ProSe server such as the ProSe server 222 in FIG. 2

Figure 8:
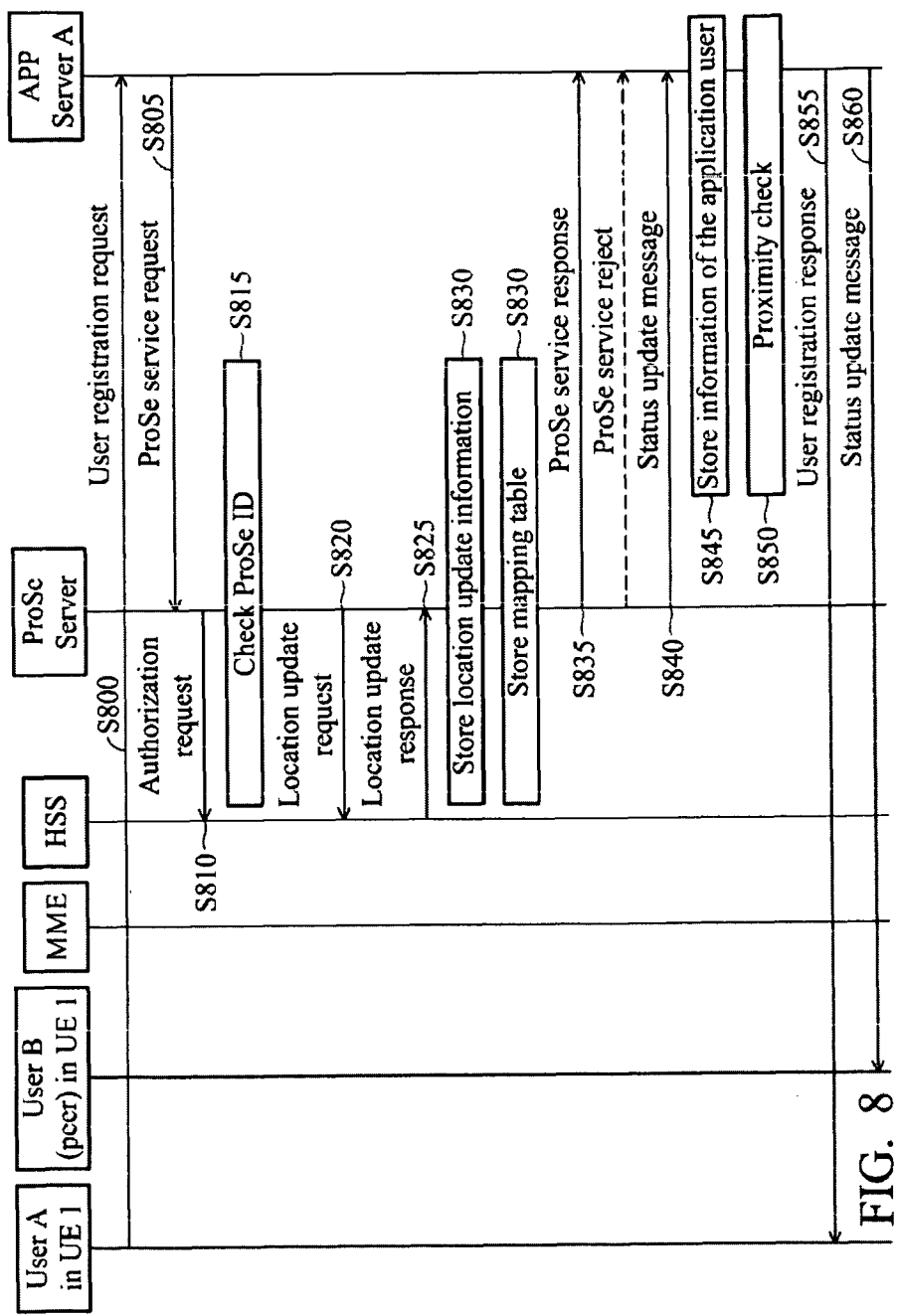
FIG. 8 illustrates a diagram of a ProSe application user registration procedure in view of an Evolved Packet System according to an embodiment of the present invention.

Please also refer to FIG. 8 to realize steps of the process 70. FIG. 8 illustrates a diagram of a ProSe application user registration procedure in view of an Evolved Packet System according to an embodiment of the present invention. The Application server uses the ProSe user application registration procedure of FIG. 7 towards a ProSe server in EPS as in FIG. 2, where each entity can be referred to the EPS 20. The cooperating entities are UE1 (with User A), UE2 (with User B), eNB, MME, HSS, ProSe server and application server. Steps S705-S740 in FIG. 7 can be found in corresponding steps in FIG. 8. The process 70 is used in a ProSe server such as the ProSe server 222 in FIG. 2. To simplify the example, in the following description User A (in UE1) in FIG. 8 is assumed to be the application user who requests to register to the application server.

In step S705 (also S805), the ProSe server receives a ProSe service request from the application server, which is sent from the application server in response to a user registration request for an application user of the application from a UE, e.g. UE1 (with User A). The user registration request (referring to S800) is sent from the application layer of the UE to the application server, and it includes a ProSe identifier which identifies the UE (e.g., UE1) enabling ProSe service, and an application user identifier (e.g., User A) of an application user who requests the application user registration. The ProSe identifier included in the user registration request is obtained by an application layer of the UE, via an Application Programming Interface (API), from a lower layer of the UE. Thereby, the ProSe service request that the ProSe server receives from the application server includes the ProSe identifier of the UE, an application server identifier (AppServer ID) uniquely identifying an application, and/or the application user identifier of the application user. Note that, the ProSe server who performs the process 70 is addressed by the application server according to the information received from the user registration request, which may be contained in an information element or obtained from the ProSe identifier.

In step S710 (also S810), the ProSe server transmits an authorization request including the application server identifier to the home subscriber server (HSS), for requesting the authorization to the application server. In step S715 (also S815), the ProSe server checks if the ProSe identifier of the UE is registered by the MME and thus determines that the authorization is successful or fails (unsuccessful).

When the authorization is determined successful, next in step S720 (also S820), if indicating in the ProSe service request for quarrying location information or another request message for ProSe discovery from the application server, the ProSe server further transmits a location update request to a network entity, for acquiring location information of the UE (e.g., UE1) which is identified by the UE identifier, e.g. ProSe identifier, or IMSI: and in response, in step S725 (also S825), the ProSe server receives a location update response including the location information of the UE, then in step S730 (also S830), the ProSe server stores the received location information of the UE. It is noticeable that the location information may be represented by an ECGI (E-UTRAN Cell Identifier), one or more cell identifiers, TAI (Tracking Area Identifier), a service area, or geometry coordinates based on network configuration and/or user's subscription and configuration of the application.

After the ProSe server obtains the location information of the UE, in step S735 (also S835), the ProSe server transmits a ProSe service response message to the application server, and the ProSe service response message includes an authorization result indicating that the authorization is successful, the ProSe identifier of the UE, or the acquired location information of the UE if requested. On the other side, when the authorization is determined unsuccessful in step S715 (also S815), the ProSe server transmits a ProSe service reject message indicating a failure cause to the application server (without performing the location update request).

In one embodiment, the ProSe further stores a mapping table including the ProSe identifier of the UE and associated application server identifiers, so the mapping table indicates the relationships between the UE (identified by the ProSe identifier) and the registered applications, wherein to simplified the example it is assumed that each one application server identifier is uniquely corresponding to one application. When considering the case that one application server may serve one or more application identified by different application identifiers, the information of the application server identifier and the registered application identifier needs to be clearly specified in the request message. If the application identifier is represented by a URI with the application server identifier as domain name, then application identifier is sufficient to identified the application and its associated application server.

Next, in step S740 (also S840), the ProSe server transmits a status update message to the application server. The status update message is for the UE (e.g., UE1) and includes at least one of following information: location information of the UE, a user registration status which indicates the registration status of the application user (e.g. User A in UE1), and device-discovery preference settings.

Please refer to FIG. 8 for the following procedure. After the application server has received the ProSe service response message (as step S840) from the ProSe server, in step S845, the application server stores information of the application user (e.g., User A) including a user registration status (which indicates the registration status of the application user), an associated peer list (e.g. the peer list for the User A), and the ProSe identifier of the UE (e.g., UE1). The peer list includes a plurality of peer application user identifiers, each identifying a peer application user who also registers the same application. The application server manages the information of the application user according to following information:

user-discovery preference settings, which indicate the preference of the application user for enabling the proximity service with a peer application user;

device-discovery preference settings, which indicates the preference of the UE for enabling the proximity service;

a device registration status, which indicates the registration status of the UE; and location information of the UE.

Since each application user has its own device-discovery preference settings, device registration status and the location information of the UE, the above three information are associated with the ProSe identifier of the UE.

Next, in step S850, the application server performs proximity check according to proximity criteria settings of the application user and the UE, after obtaining location information of the UE from the ProSe server. The proximity criteria settings indicate the required distance or a specific area between, two peer UEs for peer application users.

In step S855, the application server transmits a user registration response to the application user, i.e. transmits the user registration response to the UE (e.g., UE1) where the application user (e.g. User A) is in using. The user registration response includes information of each peer application user indicated in the associated peer list, and the information of each peer application user are related to the user preference setting, the user registration status, and the associated device registration status. For example, if User B (in UE2) is a peer application user of User A (in UE1), the user registration response sent to User A may include information of User B (since it is a peer of User A) in the peer list, including the user preference setting for User B, the user registration status of User B, and the associated device registration status of UE2.

Further, in step S860, the application server transmits a status update message to a registered peer application user (e.g., User B in UE2) of a registered application user (e.g., User A in UE1) when the application server receives the ProSe service response message (as step S835) or receives the status update message (as step S840) from the ProSe server for updating information related to the registered application User (e.g. User A). The status update message sent to the peer application user (e.g., User B) may indicate at least one of the location information of the UE (e.g., UE1) and updated user registration status of one or more ProSe peer application users in the peer list of the registered peer application user (e.g., User B) if available.

From the above, steps S800 to S860 can be regarded as the ProSe application user registration procedure including optional location information retrieval. In combination with the ProSe UE registration procedure as previously described in FIGS. 5-6, the ProSe registration procedure including ProSe UE registration procedure and one or more ProSe application users registration procedures is completed.

Note that, the ProSe server and the application server have stored and maintained respective mapping tables. The Prose server stores UE-related (device-related) information and the application server stores both UE-related information and application user-related information, which can be referred to the following Table 1:

| Mapping table | |
| --- | --- |
| ProSe Server | Application Server |
| ProSe identifier (Prose ID) | Table 1 (for each application user ID, e.g. User-A) |
| Application ID (App ID) | user registration status (for User-A) |
| | ProSe ID (for ProSe registered UE of the User-A) |
| Application server ID (AppServ ID) | peer list (peer application user IDs of User-A) |
| | Table 2 (for each ProSe ID) |
| | location information |
| | UE's ProSe registration information |
| | registered ProSe server |

From the Table 1, the application server can determine which application users to update the information of an application user which has notified the latest location information or change of the location information or registration status by the ProSe server. For example, the location information of the User-A is updated, the application server performs the following steps: 1. finds the peer list of the User-A to obtain all the application user IDs on the peer list. 2. According to the application user ID stored in table 1, e.g. User-B, the application server further checks if user registration status is active and obtains its corresponding ProSe ID (e.g. ProSe ID-B). 3. According to the ProSe ID-B, the application server further checks if the ProSe ID-B is ProSe registered according to the table 2. When abovementioned checks are passed, the application server can then determine to send status update message for updating information of the User-A towards the User-B.

Figure 9:
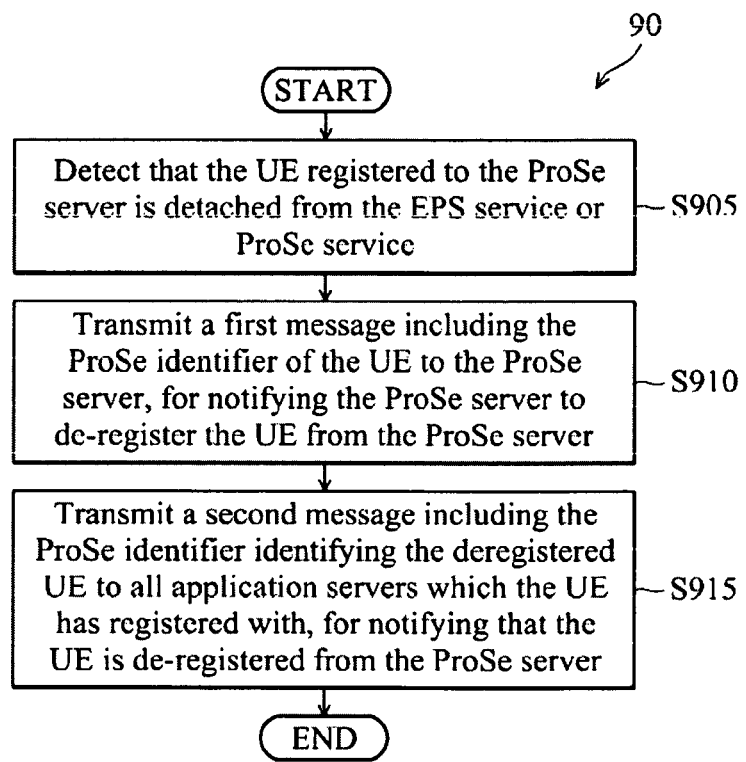
FIG. 9 is a flow chart of a process illustrating a ProSe de-registration method for a UE to de-register with the EPC for EPS service or deregistered with the EPC for the ProSe service according to an embodiment of the invention with reference to the system in FIG. 2.

FIG. 9 is a flow chart of a process 90 illustrating a ProSe de-registration method for a UE to de-register with the EPC for EPS service or deregistered with the EPC for the ProSe service according to an embodiment of the invention with reference to the system in FIG. 2. The process 90 is used in an MME such as the MME 212 in FIG. 2. In step S905, the MME detects that the UE registered to the ProSe server is detached from the EPS service or ProSe service, and in step S910, the MME transmits a first message including the ProSe identifier of the UE to the ProSe server, for notifying the ProSe server to de-register the UE from the ProSe server. The causes (reasons) that result in the detach of the UE from the ProSe service may be a detach procedure initiated by the UE;
a detach procedure initiated by a network entity, such as the MME or the HSS;
local detach by the MME; or
a tracking area update (TAU) procedure without indicating a ProSe UE registration.

In the case of the detach procedure initiated by the UE, the UE may transmit a detach request to the MME. In the case of the detach procedure initiated by the other network entity, the MME may receive a detach request from the other network entity.

Next, in step 915, the ProSe server transmits a second message including the ProSe identifier identifying the deregistered UE to all application servers which the UE has registered with, for notifying that the UE is de-registered from the ProSe server. The ProSe server obtains the information of all the application servers which the UE has registered with, such as all the application server identifiers, from a mapping table stored in the ProSe server. The mapping table is referred to the above Table 1, which indicates the relationship between the UE (identified by the ProSe identifier) and the registered applications and/or the corresponding application servers.

To simplified, it is assumed that each Application server identified by an APPServer ID is associated with one Application identified by an Application ID. For example, in Case 1 of FIG. 1A, the APPServer 1 and APPServer 2 respectively have the User-1A and the User-2A registered with the same ProSe-enabled UE1 identified by ProSe-ID1. When the UE1 is detached for the ProSe service from the network, the ProSe server notifies the APPServer 1 and APPServer 2, respectively according to the ProSe-ID1 in the stored mapping table of the ProSe server. In Case 2 of FIG. 1B, the APPServer 1 has the User-1A and the User-1B registered with the same UE1 identified by the ProSe-ID1. When the UE1 is detached for the ProSe service from the network, the ProSe server notifies the APPServer 1 according to the ProSe-ID1. Then, the APPServer 1 updates the registration status of the User-1A and User-1B to an inactive status and updates the status to all registered users on the ProSe peers lists of the User-1A and User-1B. In Case 3 of FIG. 1C, the APPServer 1 has the User-1A registered with different UEs, UE1 and UE2, identified by the ProSe-ID1 and the ProSe-ID2. When the UE1 is detached for the ProSe service from the network, the ProSe server notifies the APPServer 1 according to the ProSe-ID1. The APPServer 1 removes the association between the User-1A and the ProSe-ID1 and does not need to change the registration status of the User-1A because the User-1A still remains active on the UE2 identified by the ProSe-ID2.

In addition, the processing unit 306 in FIG. 3 could execute the program code 310 to perform any one of the above-described processes 50, 70, and 90, or others described herein.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general-purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute code or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Proximity-based Service (ProSe) registration method for a user equipment (UE) of a wireless communication system, used in a Mobility Management Entity (MME) of the wireless communication system, comprising:
   receiving an attach request or a tracking area update request for requesting ProSe UE registration from the UE;
   retrieving ProSe subscription information and ProSe preference settings related to the UE from a home subscriber server (HSS) of the wireless communication system and storing the ProSe subscription information and the ProSe preference settings related to the UE as a ProSe context of the UE;
   transmitting a ProSe registration request including a ProSe identifier of the UE and the ProSe preference settings related to the UE to a ProSe server of the wireless communication system, wherein the ProSe identifier of the UE is allocated by the MME, and is a temporary UE identifier or an identifier composed based on the temporary UE identifier identifying the UE and a ProSe server identifier identifying the ProSe server;
   reallocating the ProSe identifier of the UE when the temporary UE identifier is changed; and
   sending a first message including the reallocated ProSe identifier to the UE and sending a second message including the reallocated ProSe identifier to the ProSe server.

2. The ProSe registration method for a UE as claimed in claim 1, wherein the ProSe server identifier is pre-configured in the MME, or is stored in the ProSe subscription information of the UE retrieved from the HSS.

3. The ProSe registration method for a UE as claimed in claim 1, wherein the temporary UE identifier is a Globally Unique Temporary Identity (GUTI) or an International Mobile Subscriber Identity (IMSI).

4. The ProSe registration method for a UE as claimed in claim 1, further comprising:
   receiving a ProSe registration accept message from the ProSe server, when the ProSe UE registration is regarded successful.

5. The ProSe registration method for a UE as claimed in claim 4, further comprising:
   transmitting an attach accept or a tracking area update accept including the ProSe identifier of the UE, to the UE, for the UE being able to store the received ProSe identifier.

6. The ProSe registration method for a UE as claimed in claim 1, further comprising:
   receiving a ProSe registration reject message from the ProSe server, when the ProSe UE registration is regarded unsuccessful.

7. The ProSe registration method for a UE as claimed in claim 6, further comprising:
   transmitting an attach accept or an tracking area update accept without the ProSe identifier of the UE, to the UE, when the ProSe UE registration is regarded unsuccessful.

8. A mobility management entity (MME) for Proximity-based Service (ProSe) registration in a wireless communication system, comprising:
   a control circuit;
   a processor installed in the control circuit;
   a memory installed in the control circuit and operatively coupled to the processor;
   wherein the processor is configured to execute a program code stored in the memory to process the following:
   receiving an attach request or a tracking area update request for requesting ProSe UE registration from a user equipment (UE);
   retrieving ProSe subscription information and ProSe preference settings related to the UE from a home subscriber server (HSS) of the wireless communication system and storing the ProSe subscription information and the ProSe preference settings related to the UE as a ProSe context of the UE;
   transmitting a ProSe registration request including a ProSe identifier of the UE and the ProSe preference settings related to the UE to a ProSe server of the wireless communication system, wherein the ProSe identifier of the UE is allocated by the MME, and is a temporary UE identifier or an identifier composed based on the temporary UE identifier identifying the UE and a ProSe server identifier identifying the ProSe server;
   reallocating the ProSe identifier of the UE when the temporary UE identifier is changed; and
   sending a first message including the reallocated ProSe identifier to the UE and sending a second message including the reallocated ProSe identifier to the ProSe server.

9. The mobility management entity (MME) as claimed in claim 8, wherein the ProSe server identifier is pre-configured in the MME, or is stored in the ProSe subscription information of the UE retrieved from the HSS.

10. The mobility management entity (MME) as claimed in claim 8, wherein the temporary UE identifier is a Globally Unique Temporary Identity (GUTI) or an International Mobile Subscriber Identity (IMSI).

11. The mobility management entity (MME) as claimed in claim 8, further comprising:
    receiving a ProSe registration accept message from the ProSe server, when the ProSe UE registration is regarded successful.

12. The mobility management entity (MME) as claimed in claim 11, further comprising:
    transmitting an attach accept or a tracking area update accept including the ProSe identifier of the UE, to the UE, for the UE being able to store the received ProSe identifier.

13. The mobility management entity (MME) as claimed in claim 8, further comprising:
    receiving a ProSe registration reject message from the ProSe server, when the ProSe UE registration is regarded unsuccessful.

14. The mobility management entity (MME) as claimed in claim 13, further comprising:

transmitting an attach accept or an tracking area update accept without the ProSe identifier of the UE, to the UE, when the ProSe UE registration is regarded unsuccessful.

\* \* \* \* \*